United States Patent [19]

Fleischman

[11] 4,230,397
[45] * Oct. 28, 1980

[54] LARGE APERTURE EXTENDED RANGE ZOOM LENS

[75] Inventor: Andor A. Fleischman, Northbrook, Ill.

[73] Assignee: Bell & Howell Company, Chicago, Ill.

[*] Notice: The portion of the term of this patent subsequent to Dec. 13, 1994, has been disclaimed.

[21] Appl. No.: 944,341

[22] Filed: Sep. 21, 1978

[51] Int. Cl.² .............................................. G02B 15/18
[52] U.S. Cl. .................................................... 350/184
[58] Field of Search ................................. 350/184, 186

[56] References Cited

U.S. PATENT DOCUMENTS

| | | | |
|---|---|---|---|
| 3,773,402 | 11/1973 | Gela et al. | 350/184 |
| 3,784,285 | 1/1974 | Watanabe | 350/184 |
| 4,062,621 | 12/1977 | Fleischman | 350/184 |

Primary Examiner—Conrad J. Clark
Attorney, Agent, or Firm—Harold V. Stotland; Roger M. Fitz-Gerald

[57] ABSTRACT

Disclosed is an optical design for a variable focal length lens of large effective aperture which is focusable over an extended range including the "macro" range and is provided with a high degree of correction.

1 Claim, 17 Drawing Figures

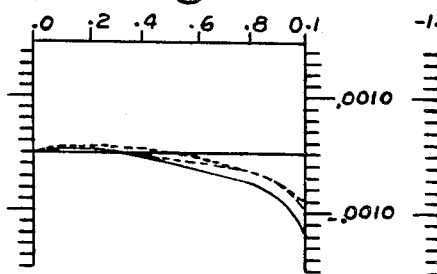
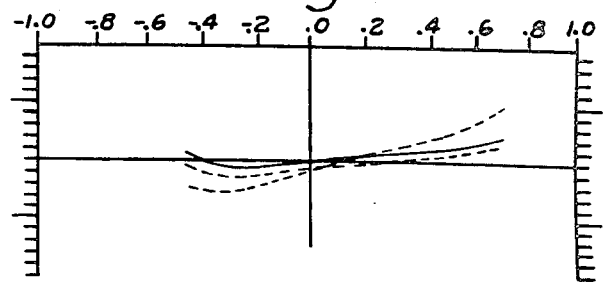
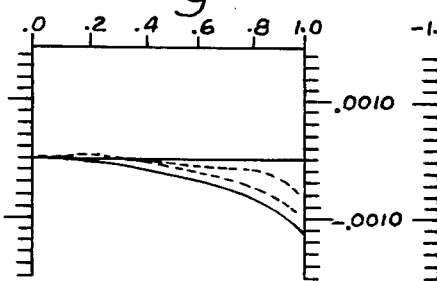
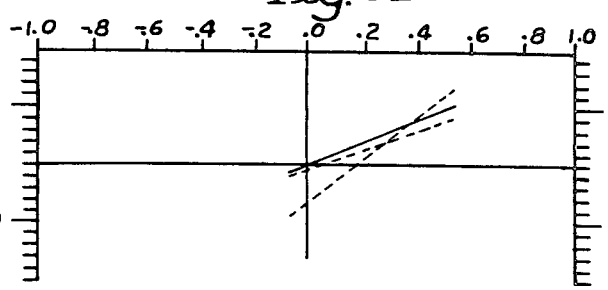
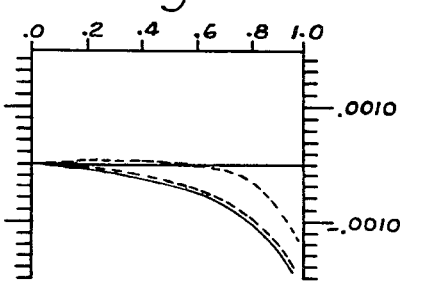
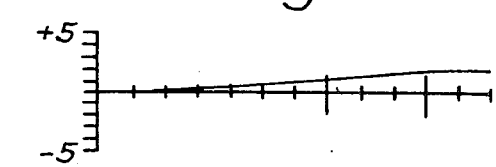
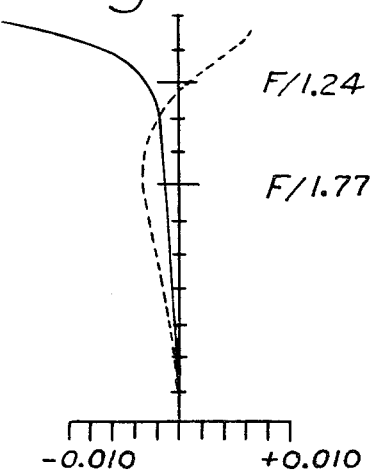
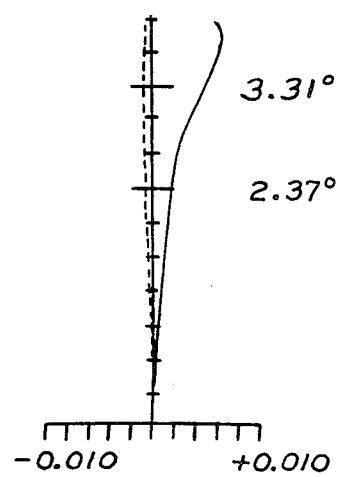

LARGE APERTURE EXTENDED RANGE ZOOM LENS

This invention relates to a variable focal length lens of large effective aperture, and more particularly to a variable focal length lens, focusable over an extended range, and highly corrected over a large range of magnification.

Many zoom lenses or variable equivalent focal length lenses have been designed having moderate effective apertures insofar as are desired to be competitive with the existing market of photographic equipment, such as motion picture cameras. Recently, another generation of zoom lenses has been designed having unusually large apertures in the f/1.2 class. Generally, these lenses have had magnification ratios not exceeding three-to-one. Thus, the benefit of the high effective aperture has been offset against a low magnification ratio. Other lenses of lesser apertures, although of similar or slightly greater magnification ratios to the high aperture lenses, have been designed for focusing in a range of less than the normal range of approximately 1 meter to infinity. This less than normal focusing range enabling focusing from several millimeters from the lens to the closest distance of the normal range is referred to as the "Macro" range. Most lenses with a high aperture or a high magnification ratio are not capable of maintaining the required high degree of correction when focusing in the macro range. Hence, only a few relatively special, and therefore generally expensive lenses have been designed and are available having the combination of features incorporated in the present lens design. Also, because of the expense of these lenses, most have not been competitive so as to receive acceptance in the mass market by the "home" movie makers.

Another object of the invention is to provide a relatively compact and relatively inexpensive zoom lens highly corrected over a magnification range greater than the more conventional three-to-one range of zoom lenses of comparable large effective apertures.

It is to be understood that the terms "front" and "rear" as used herein refer to the ends of the objective respectively nearer the long and short conjugates thereof.

Other objects and advantages of the invention will become apparent from the detailed description which follows when taken in conjunction with the accompanying drawings in which:

FIGS. 3A to 3H are similar graphical representations of the Table 1 lens system when in the telephoto mode.

Figure 1:
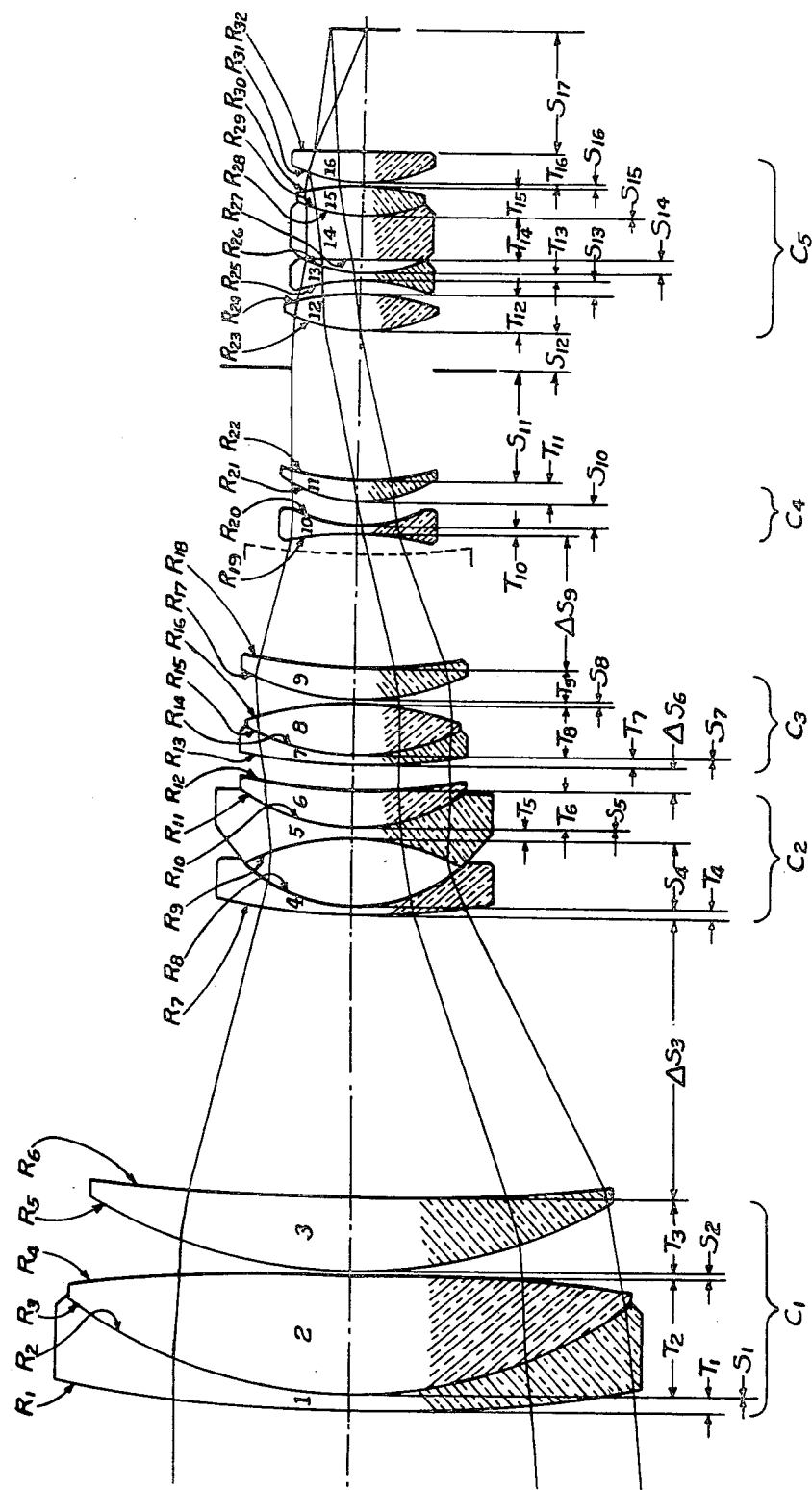
FIG. 1 is a diagrammatic sectional view of a preferred optical system according to the present invention.

Referring to the drawings, a zoom lens or variable equivalent focal length objective lens is shown. Particularly, the lens is highly corrected over a relatively large magnification range, and is capable of focus in the macro range as well as the normal range. Further, the lens has a relatively large effective aperture when compared to other lens designs having the zoom range.

The lens includes a positive first component $C_1$, starting at the ray entrance side of the optical system, which component is adjustable axially through a short distance for focusing of the optical system throughout a range of approximately 1 meter to infinity. Component $C_2$ is a variator or negative component variable along the axis of the optical system for varying the equivalent focal length of the objective. The equivalent focal length is variable over greater than a six-to-one range of magnification while maintaining a high degree of optical correction for a large aperture of at least f/1.2 throughout the range. Component $C_3$ is a component adjustable axially upon axial adjustment of the variator, to function as a compensator for correcting berrations caused by varying the focal length of the optical system. $C_2$ is independently adjustable for focusing of the optical system in the macro range. Component $C_4$ is a fixed lens member for further collimating rays exiting the compensator component $C_3$. Rear component $C_5$ is a prime lens group forming an afocal system with the earlier described components.

The front component $C_1$, comprises a front biconvex cemented doublet $L_1$, $L_2$, and a rear singlet $L_3$, predominately convex forwardly and spaced close to the doublet $L_1$, $L_2$. Air spaced from the rear of the singlet $L_3$ and adjustable relative thereto is component $C_2$ which comprises a front negative meniscus singlet $L_4$ convex forwardly and a rear biconcave, cemented doublet $L_5$, $L_6$ predominately concave forwardly. The doublet has collective internal contact surfaces $R_{10}$, $R_{11}$.

Component $C_3$ is variably air spaced relative to component $C_2$ and the following component $C_4$. Component $C_3$ comprises a positive doublet $L_7$, $L_8$ predominately convex rearwardly. During a zooming or focal length varying operation, the component $C_3$ is moved axially at a rate proportional to the rate of movement of component $C_2$. However, for macro focusing action, the driver (not shown) of the components $C_2$ and $C_3$ by which axial adjustment thereof is accomplished is disconnected from component $C_3$ to cause that component to remain stationary while component $C_2$ is adjusted axially for focusing.

Component $C_4$ is fixed ahead of the stop of the optical system and comprises a front negative meniscus singlet $L_{10}$ and a rear positive meniscus singlet $L_{11}$ which together form a substantially afocal system cooperating with the rear prime lens system $C_5$.

Component $C_5$ comprises a front biconvex singlet $L_{12}$, spaced somewhat from a negative element $L_{13}$. A doublet of elements $L_{14}$ and $L_{15}$ is arranged between element $L_{13}$ and rear element $L_{16}$ which is a singlet predominately convex forwardly.

The elements $L_1$ to $L_{16}$ have spherical surfaces or radii of curvature $R_1$ to $R_{32}$, axial thicknesses $T_1$ to $T_{16}$ and axial separations $S_1$ to $S_{17}$. The separations at $S_{11}$ and $S_{12}$ are sufficient to provide clearance for an aperture adjusting stop.

A preferred embodiment of the macro focusing, large aperture, zoom lens of the invention is constructed according to the table following wherein dimensions are as set forth and the refractive indices for the sodium D line and the Abbe dispersion numbers are respectively designated at $N_D$ and V.

| | SYSTEM EFL<br>at W/A - 7.61mm (.2997 in.)<br>at T/P = 56.98mm (2.2433 in.)<br>at MID = 25.67mm (1.0105 in.) | | HALF ANGLE OF FIELD<br>25.35°<br>3.31°<br>7.58° | | |
|---|---|---|---|---|---|
| LENS | RADII (mm.) | THICKNESS (mm.) | SPACINGS (mm) | $N_D$ | V |
| 1 | $R_1$ = 240.7589 | $T_1$ = 1.6510 | | 1.755 | 27.6 |
| | $R_2$ = −51.1988 | | $S_1$ = 0 | | |
| 2 | $R_3$ = 51.1988 | $T_2$ = 12.7000 | | 1.620 | 60.4 |
| | $R_4$ = 153.6954 | | $S_2$ = .1016 | | |
| 3 | $R_5$ = 43.6880 | $T_3$ = 7.7978 | | 1.651 | 55.9 |
| | $R_6$ = −139.7000 | | $S_3$ = 4.2875 at W/A<br>29.5554 at T/P<br>22.3952 at MID | | |
| 4 | $R_7$ = 71.7550 | $T_4$ = .8128 | | 1.639 | 55.4 |
| | $R_8$ = −16.5100 | | $S_4$ = 6.6294 | | |
| 5 | $R_9$ = −24.0030 | $T_5$ = .8382 | | 1.620 | 60.4 |
| | $R_{10}$ = −19.1008 | | $S_5$ = 0 | | |
| 6 | $R_{11}$ = 19.1008 | $T_6$ = 3.5052 | | 1.785 | 25.8 |
| | $R_{12}$ = −59.9948 | | $S_6$ = 38.4048 at W/A<br>2.5857 at T/P<br>14.2570 at MID | | |
| 7 | $R_{13}$ = 58.9280 | $T_7$ = .8890 | | 1.805 | 25.4 |
| | $R_{14}$ = −21.7424 | | $S_7$ = 0 | | |
| 8 | $R_{15}$ = 21.7424 | $T_8$ = 5.6388 | | 1.641 | 60.1 |
| | $R_{16}$ = 30.2260 | | $S_8$ = .1016 | | |
| 9 | $R_{17}$ = 22.7203 | $T_9$ = 3.1496 | | 1.691 | 54.9 |
| | $R_{18}$ = −93.1672 | | $S_9$ = 1.6002 at W/A<br>12.1514 at T/P<br>7.6403 at MID | | |
| 10 | $R_{19}$ = −45.5168 | $T_{10}$ = .7112 | | 1.691 | 54.9 |
| | $R_{20}$ = −12.8016 | | $S_{10}$ = 2.2352 | | |
| 11 | $R_{21}$ = 14.6431 | $T_{11}$ = 2.0574 | | 1.805 | 25.4 |
| | $R_{22}$ = −27.0256 | | $S_{11}$ = 11.0490<br>STOP<br>$S_{12}$ = 3.5560 | | |
| 12 | $R_{23}$ = 18.0848 | $T_{12}$ = 3.6576 | | 1.744 | 44.8 |
| | $R_{24}$ = 32.8168 | | $S_{13}$ = 1.6002 | | |
| 13 | $R_{25}$ = −21.9202 | $T_{13}$ = .7112 | | 1.805 | 25.4 |
| | $R_{26}$ = −16.8656 | | $S_{14}$ = .7366 | | |
| 14 | $R_{27}$ = 61.2140 | $T_{14}$ = 4.3180 | | 1.805 | 25.4 |
| | $R_{28}$ = −14.5288 | | $S_{15}$ = 0 | | |
| 15 | $R_{29}$ = 14.5288 | $T_{15}$ = 3.2512 | | 1.744 | 44.8 |
| | $R_{30}$ = 26.9494 | | $S_{16}$ = .1270 | | |
| 16 | $R_{31}$ = 14.7320 | $T_{16}$ = 2.5654 | | 1.734 | 51.7 |
| | $R_{32}$ = −463.9259 | | $S_{17}$ = 11.4529 | | |

In the above table, the first column lists the lens elements numerically starting at the ray entrance side of the system. The second column lists the respective radii of the elements in millimeters. The third column lists the axial thickness T of the respective elements in millimeters. The fourth column lists in millimeters the axial spacings between the respective elements, and the nominal image plane. "EFL" is the effective focal length of the lens system at wide angle condition "W/A", at telephoto condition "T/P", and at mid range condition "MID". "One-half Angle of Field" is one half the angle between the continuation of the lens axis and a line from the nodal point of the lens to the most oblique point recorded on the film when considered at the above expressed condition.

Figure 2A:
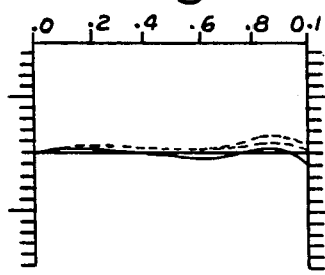
FIGS. 2A to 2H are graphical representations of the various aberrations of the lens system shown in FIG. 1 and having the design data given in Table 1 when in the wide angle mode.
Figure 2B:
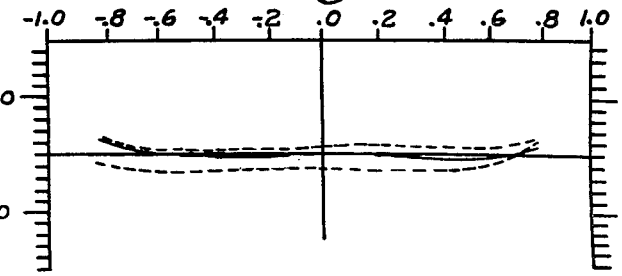
Figure 2C:
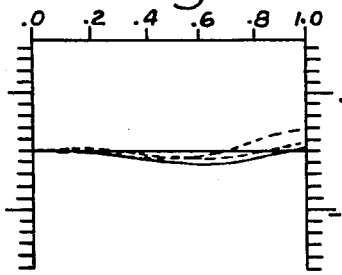
Figure 2D:
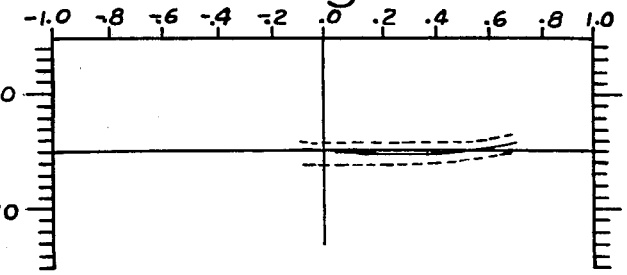
Figure 2E:
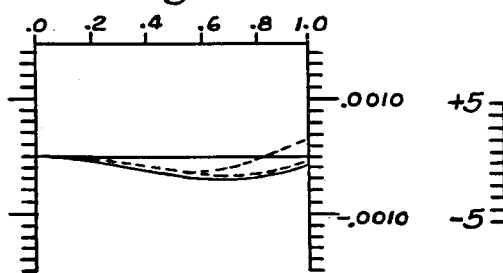
Figure 2F:
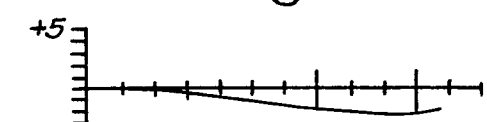
Figure 2G:
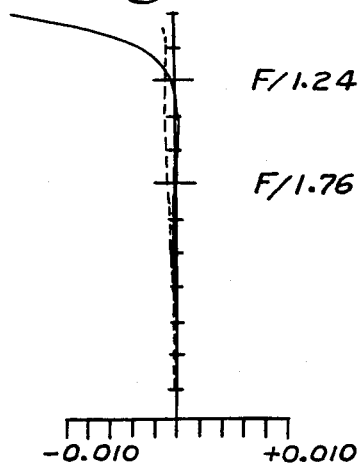
Figure 2H:
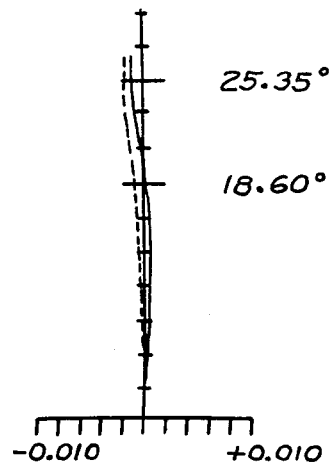

FIGS. 2A to 2H graphically represent various aberrations of the form of the optical system, as shown in FIG. 1 and having the design data recited in the above table. FIG. 2A represents correction of the rays on axis. FIG. 2B represents off axis aberrations of rays passing from the zone of the film format and through the lens transversely and tangentially. FIG. 2C represents the aberrations of the rays passing from the corner of the film format through the lens tangentially and transversely. FIG. 2D represents the radial or longitudinal aberrations from the zone of the film format of rays entering the lens at 3 o'clock, while FIG. 2E represents similar aberrations from full field or corner rays. FIG. 2F represents distortion as a percentage of a "perfect" image. FIG. 2C represents the spherical aberrations by a full line and the offense-against-sine condition by the dotted line. FIG. 2H represents the curvature of field with tangential curvature being shown in full line and sagittal curvature being shown in dashed line.

FIGS. 3A to 3H graphically represent various aberrations of the optical system with the lens adjusted to the telephoto condition, as opposed to the wide angle condition as represented in FIGS. 2A to 2H. In FIGS. 2A to 2E and 3A to 3E, the solid line represents the aberrations of a light ray at 5893 A°, the dotted line represents a light ray at 6563 A°, and the dashed line a light ray at 4861 A°.

What I claim is:

1. An optical system for a variable focal length lens of large effective aperture, which is focusable over an extended range, having substantially the following specification:

| SYSTEM EFL | | HALF ANGLE OF FIELD |
|---|---|---|
| at W/A = | 7.61mm (.2997 in.) | 25.35° |
| at T/P = | 56.98mm (2.2433 in.) | 3.31° |
| at MID = | 25.67mm (1.0105 in.) | 7.58° |

| LENS | RADII (mm.) | THICKNESS (mm.) |
|---|---|---|
| 1 | $R_1 = 240.7589$ | |
| | | $T_1 = 1.6510$ |
| | $R_2 = -51.1988$ | |
| 2 | $R_3 = 51.1988$ | |
| | | $T_2 = 12.7000$ |
| | $R_4 = 153.6954$ | |
| 3 | $R_5 = 43.6880$ | |
| | | $T_3 = 7.7978$ |
| | $R_6 = -139.7000$ | |
| 4 | $R_7 = 71.7550$ | |
| | | $T_4 = .8128$ |
| | $R_8 = -16.5100$ | |
| 5 | $R_9 = -24.0030$ | |
| | | $T_5 = .8382$ |
| | $R_{10} = -19.1008$ | |
| 6 | $R_{11} = 19.1008$ | |
| | | $T_6 = 3.5052$ |
| | $R_{12} = -59.9948$ | |
| 7 | $R_{13} = 58.9280$ | |
| | | $T_7 = .8890$ |
| | $R_{14} = -21.7424$ | |
| 8 | $R_{15} = 21.7424$ | |
| | | $T_8 = 5.6388$ |
| | $R_{16} = 30.2260$ | |
| 9 | $R_{17} = 22.7203$ | |
| | | $T_9 = 3.1496$ |
| | $R_{18} = -93.1672$ | |
| 10 | $R_{19} = -45.5168$ | |
| | | $T_{10} = .7112$ |
| | $R_{20} = -12.8016$ | |
| 11 | $R_{21} = 14.6431$ | |
| | | $T_{11} = 2.0574$ |
| | $R_{22} = -27.0256$ | |
| 12 | $R_{23} = 18.0848$ | |
| | | $T_{12} = 3.6576$ |
| | $R_{24} = 32.8168$ | |
| 13 | $R_{25} = -21.9202$ | |
| | | $T_{13} = .7112$ |
| | $R_{26} = -16.8656$ | |
| 14 | $R_{27} = 61.2140$ | |
| | | $T_{14} = 4.3180$ |
| | $R_{28} = -14.5288$ | |
| 15 | $R_{29} = 14.5288$ | |
| | | $T_{15} = 3.2512$ |
| | $R_{30} = 26.9494$ | |
| 16 | $R_{31} = 14.7320$ | |
| | | $T_{16} = 2.5654$ |
| | $R_{32} = -463.9259$ | |

| LENS | RADII (mm.) | SPACINGS (mm) | $N_D$ | V |
|---|---|---|---|---|
| 1 | $R_1 = 240.7589$ | | 1.755 | 27.6 |
| | $R_2 = -51.1988$ | $S_1 = 0$ | | |
| 2 | $R_3 = 51.1988$ | | 1.620 | 60.4 |
| | $R_4 = 153.6954$ | $S_2 = .1016$ | | |
| 3 | $R_5 = 43.6880$ | | 1.651 | 55.9 |
| | $R_6 = -139.7000$ | $S_3 = 4.2875$ at W/A<br>29.5554 at T/P<br>22.3952 at MID | | |
| 4 | $R_7 = 71.7550$ | | 1.639 | 55.4 |
| | $R_8 = -16.5100$ | $S_4 = 6.6294$ | | |
| 5 | $R_9 = -24.0030$ | | 1.620 | 60.4 |
| | $R_{10} = -19.1008$ | $S_5 = 0$ | | |
| 6 | $R_{11} = 19.1008$ | | 1.785 | 25.8 |
| | $R_{12} = -59.9948$ | $S_6 = 38.4048$ at W/A<br>2.5857 at T/P<br>14.2570 at MID | | |
| 7 | $R_{13} = 58.9280$ | | 1.805 | 25.4 |
| | $R_{14} = -21.7424$ | $S_7 = 0$ | | |
| 8 | $R_{15} = 21.7424$ | | 1.641 | 60.1 |
| | $R_{16} = 30.2260$ | $S_8 = .1016$ | | |
| 9 | $R_{17} = 22.7203$ | | 1.691 | 54.9 |
| | $R_{18} = -93.1672$ | $S_9 = 1.6002$ at W/A<br>12.1514 at T/P | | |

-continued

| | | | | | |
|---|---|---|---|---|---|
| | | 7.6403 at MID | | | |
| 10 | $R_{19} = -45.5168$ | | | 1.691 | 54.9 |
| | $R_{20} = -12.8016$ | | | | |
| | | $S_{10} = 2.2352$ | | | |
| 11 | $R_{21} = 14.6431$ | | | 1.805 | 25.4 |
| | $R_{22} = -27.0256$ | | | | |
| | | $S_{11} = 11.0490$ | | | |
| | | ——STOP—— | | | |
| | | $S_{12} = 3.5560$ | | | |
| 12 | $R_{23} = 18.0848$ | | | 1.744 | 44.8 |
| | $R_{24} = 32.8168$ | | | | |
| | | $S_{13} = 1.6002$ | | | |
| 13 | $R_{25} = -21.9202$ | | | 1.805 | 25.4 |
| | $R_{26} = -16.8656$ | | | | |
| | | $S_{14} = .7336$ | | | |
| 14 | $R_{27} = 61.2140$ | | | 1.805 | 25.4 |
| | $R_{28} = -14.5288$ | | | | |

-continued

| | | | | | |
|---|---|---|---|---|---|
| | | $S_{15} = 0$ | | | |
| 15 | $R_{29} = 14.5288$ | | | 1.744 | 44.8 |
| | $R_{30} = 26.9494$ | | | | |
| | | $S_{16} = .1270$ | | | |
| 16 | $R_{31} = 14.7320$ | | | 1.734 | 51.7 |
| | $R_{32} = -463.9259$ | | | | |
| | | $S_{17} = 11.4529$ | | | | wherein the first column lists the lens elements numerically starting at the ray entrance side of the system; the second column lists the respective base radii $R_1$ to $R_{32}$; the third column lists the thicknesses $T_1$-$T_{16}$ of the respective elements; the fourth column lists the axial spacings $S_1$ to $S_{17}$ between the respective elements, and stop, and the image plane; and the fifth and sixth columns respectively list the index of refraction for the Sodium D line $N_D$ and the dispersive index V of the optical materials of the respective elements.

* * * * *

UNITED STATES PATENT AND TRADEMARK OFFICE
CERTIFICATE OF CORRECTION

PATENT NO. : 4,230,397
DATED : October 28, 1980
INVENTOR(S) : Andor A. Fleischman It is certified that error appears in the above-identified patent and that said Letters Patent are hereby corrected as shown below:

Column 1, line 10, after "nification.", insert --Another such lens is disclosed in the present applicant's U. S. Patent 4,062,621.--;

Column 2, line 17, correct spelling of "aberrations";

Column 5, line 25, change "2C" to --2G--.

Signed and Sealed this

Ninth Day of February 1982

[SEAL]

Attest:

GERALD J. MOSSINGHOFF

Attesting Officer

Commissioner of Patents and Trademarks